United States Patent [19]
Johnston

[11] 3,961,572
[45] June 8, 1976

[54] TRAMPER FOR COTTON MODULE MAKER

[75] Inventor: Douglas Johnston, Decatur, Ala.

[73] Assignee: John Blue Company Division of Subscription Television, Inc., New York, N.Y.

[22] Filed: Apr. 29, 1974

[21] Appl. No.: 465,437

[52] U.S. Cl. ................................. 100/53; 100/100; 100/226; 100/269 R; 100/295; 214/9
[51] Int. Cl.² ..................... B30B 15/28; B30B 1/32
[58] Field of Search ............... 214/9, 83.3; 100/214, 100/226, 269 R, 53, 215, 100, 218, 295

[56] References Cited
UNITED STATES PATENTS

| | | | |
|---|---|---|---|
| 2,302,132 | 11/1942 | MacMillin et al. | 100/269 R |
| 3,030,879 | 4/1962 | Lasko | 100/214 X |

FOREIGN PATENTS OR APPLICATIONS

| | | | |
|---|---|---|---|
| 364,058 | 10/1938 | Italy | 100/295 |

*Primary Examiner*—Billy J. Wilhite
*Attorney, Agent, or Firm*—Cushman, Darby & Cushman

[57] ABSTRACT

A method and apparatus are disclosed for temporarily storing cotton after harvesting by forming the cotton into modules. The apparatus includes a box frame which is open at the top and bottom and has a door at one end thereof. The apparatus includes a carriage which is mounted for movement longitudinally along the top of the frame. A tramper footing is mounted for vertical movement with respect to the carriage, which tramper compresses the cotton within the frame to form the cotton module. The tramper is powered by means of a hydraulic piston and cylinder arrangement wherein the piston and cylinder arrangement can be retracted into the frame when the frame is transported from one place to another. A hydraulic system is provided for controlling both the displacement and the rate of displacement of the tramper during the cotton compacting process. After the cotton module has been formed, retractible wheels on opposite sides of the frame raise the frame to allow the frame to move longitudinally relative to the cotton module.

17 Claims, 12 Drawing Figures

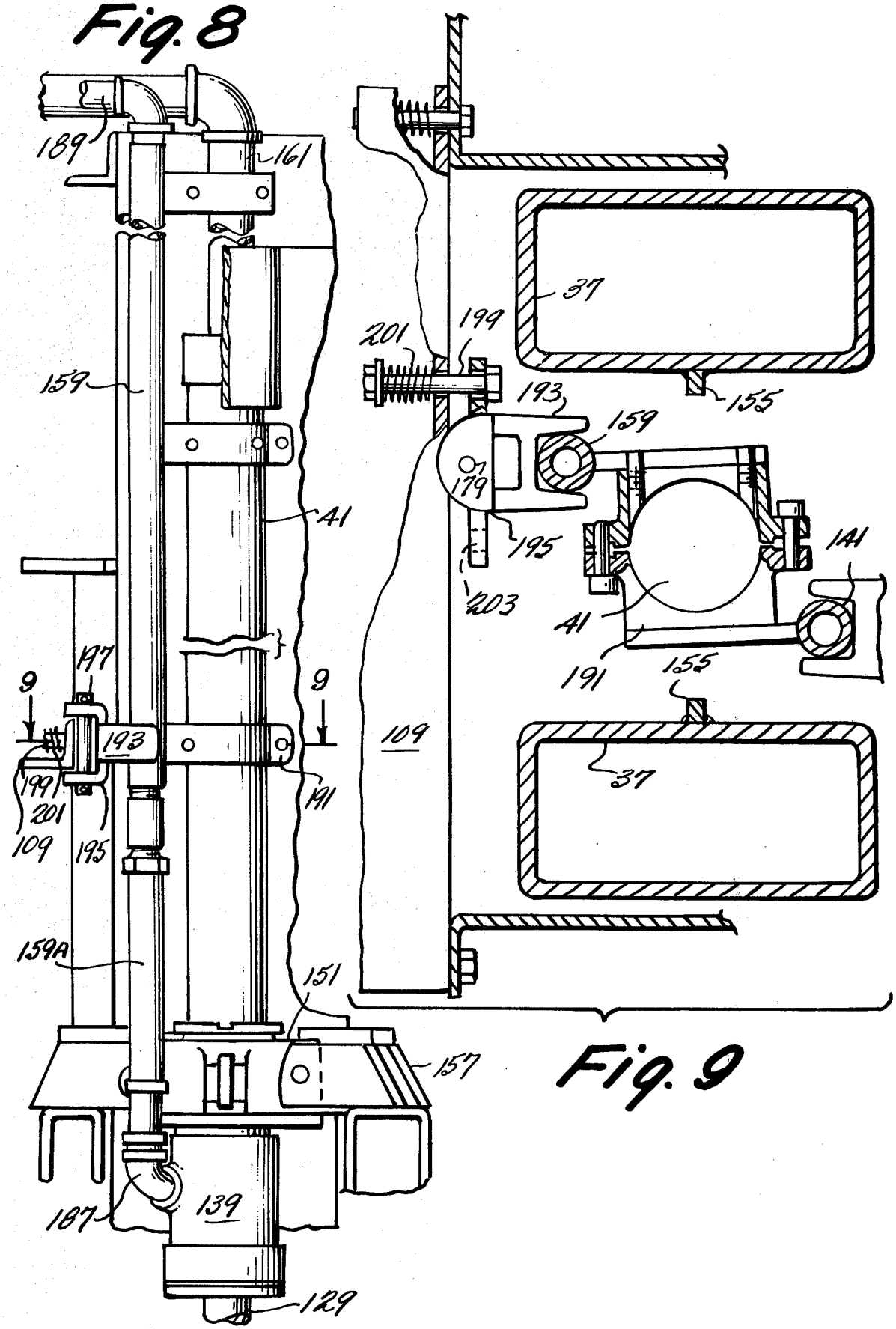

TRAMPER FOR COTTON MODULE MAKER

BACKGROUND OF THE INVENTION

This invention relates broadly to agricultural crop handling apparatus and, more specifically, to apparatus for temporarily storing cotton and other compactible materials in the form of modules.

Cotton is usually picked by a mechanical harvester which is driven along the row of cotton plants. The cotton is collected in a large basket or bin in the harvester. When the basket is filled, the cotton is dumped into a wagon and transported to the gin for subsequent processing. Since the seed cotton is transported to the gin soon after it is packed, the gin typically operates at full capacity during the harvesting season. However, since the season is relatively short, the gin remains idle between ginning seasons.

Various attempts have been made to handle the seed cotton more efficiently. For example, as disclosed in U.S. Pat. Nos. 3,215,291, 3,412,532, and 3,422,751, devices have been provided for compacting the seed cotton in the basket of the harvester to thereby reduce the bulk of the cotton. This allows the harvester to operate for longer periods before dumping the basket but, unfortunately, does not overcome the problem of storing the cotton temporarily to provide for a lengthened ginning season. Mechanical compaction of other crops has also been proposed, as disclosed in U.S. Pat. No. 3,556,327 which is primarily concerned with the compaction of hay. As in the case of the aforementioned patents, compaction associated with the device disclosed in U.S. Pat. No. 3,556,327 is not concerned with the particular problems associated with the stacking of cotton before being transported to a gin.

The use of a slip form to stack or rick cotton on the ground in the field as a means for temporarily storing the cotton has been attempted in the past, as disclosed in U.S. Pat. No. 3,703,966. The slip form is a rectangular boxlike container which is open at the top and bottom and is open at one end thereof. Seed cotton is dumped from the harvester into the top of the form. The cotton inside the form is tramped down by manual means after each load is dumped into the harvester. When the form has been filled in this manner, the form is pulled endwise along the ground leaving behind a stack or rick of cotton extending through the open end of the form. The process is repeated until a rick of desired length has been produced. Although the use of the slip form permits the cotton to be stored in the field, the fact that manual labor is required for compacting the cotton results in a low density and uneven rick of cotton. This causes the rick to have a low degree of structural integrity and accordingly, the rick tends to come apart quite easily. Because the rick of cotton is difficult to handle, the savings in cost of extending the ginning season is reduced by the additional cost of handling the cotton after the rick is formed.

More recently a mechanical cotton stacking apparatus has been provided which includes a slip form for forming ricks of cotton wherein a mechanical compactor is positioned at the end of the form to compact the cotton proximate the end of the slip. This arrangement has a number of drawbacks including the fact that a rick of cotton is difficult to handle even when compacted mechanically and in addition, since only the cotton proximate the end of the slip form is compacted, the cotton remaining in the slip form at the end of the rick does not become compacted and will become wasted unless manually retrieved.

More recently, as disclosed in U.S. Pat. No. 3,749,003, a cotton module maker has been provided. This device includes a box-like frame having a movable carriage on the top thereof. The carriage includes a compactor which moves vertically with respect to the frame to compact cotton positioned within the frame. After the module has been formed, the frame is moved to another position to form another module. This apparatus, while an improvement over the prior art, has a number of disadvantages including the fact that a rack and pinion arrangement is utilized for compacting the cotton, as opposed to an improved hydraulic system, no means are included for precisely controlling the rate of movement of the compactor with respect to the frame, and no means are disclosed for withdrawing the compactor mechanism including the pinion and ratchet assembly into the frame when the frame is being transported from one place to another.

It therefore is an object of this invention to provide an improved tramper mechanism for forming cotton modules.

SHORT STATEMENT OF THE INVENTION

Accordingly, this invention relates to a tramper mechanism for forming cotton modules which includes a box frame having an open top and bottom with a door at one end thereof. A carriage is mounted for longitudinal movement along the top of the frame. Cotton is deposited in the frame preferably upon a pallet which facilitates handling the cotton after the module is formed. A tramper footing is mounted for reciprocal vertical movement with respect to the carriage, the tramper footing compacting the cotton within the frame to form the cotton module. A hydraulically driven piston and cylinder arrangement is releasably fixed to the carriage at an operational position for raising and lowering the tramper footing with respect to the carriage. A hydraulic control system is provided for accurately and efficiently controlling both the position and the rate of movement of the tramper footing. The carriage moves back and forth along the longitudinal length of the frame while the tramper footing compacts the cotton to form the module. When the module has been formed, the door at one end of the frame is opened and retractible wheels on the frame raise the frame so that the frame can be transported away from the module.

When the frame is being transported on public highways or in places having telephone or power lines extending overhead, the piston and cylinder arrangement is retracted into the frame so as to provide a low clearance level for the tramper mechanism.

BRIEF DESCRIPTION OF THE DRAWINGS

Other objects, features and advantages of the present invention will become more fully apparent from the following detailed description of the preferred embodiment, the appended claims and the accompanying drawings in which:

FIG. 8 is a partial elevation view of the cylinder of the tramper mechanism of the present invention;

FIG. 9 is a section view taken along the lines 9—9 of FIG. 8 illustrating the means for preventing the rotation of the cylinder in the carriage;

DETAILED DESCRIPTION OF THE PREFERRED EMBODIMENT

Figure 1:
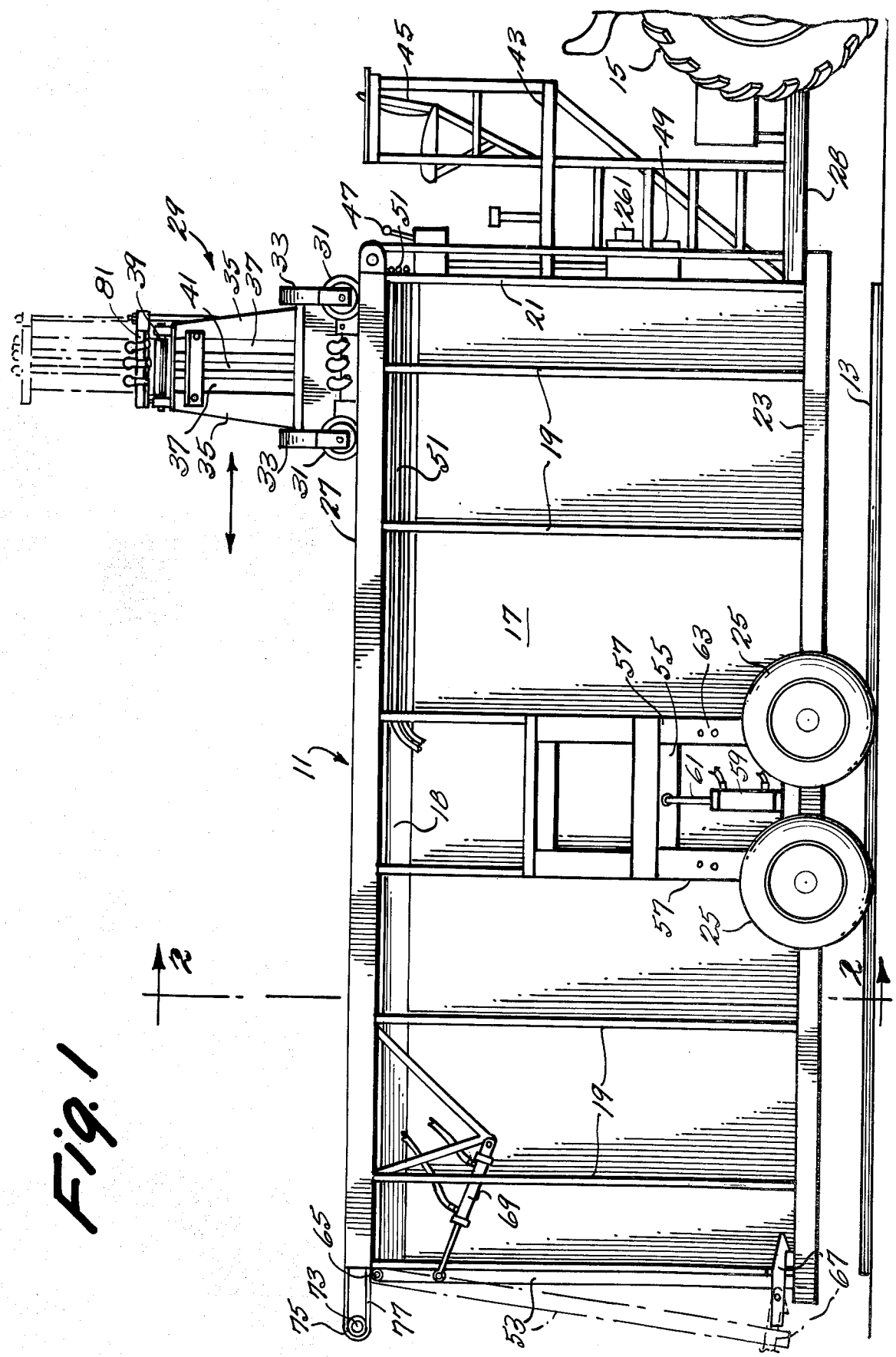
FIG. 1 is a side elevational view of the frame of the tramper mechanism of the present invention with the frame raised with respect to ground by retractible wheels.
Figure 2:
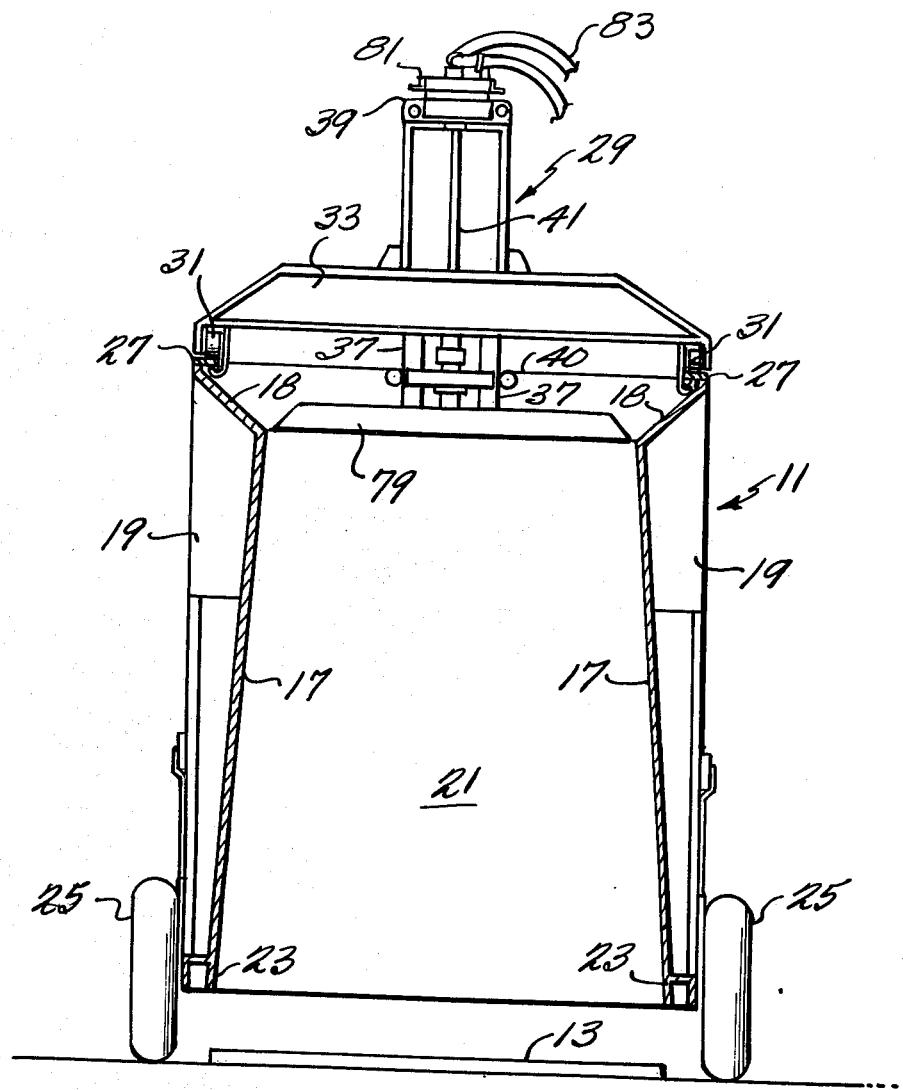
FIG. 2 is a section view of the frame of the tramper mechanism taken along the lines 2—2 of FIG. 1.

Refer now to FIG. 1 which is a side elevation view of the tramper mechanism for forming cotton modules of the present invention. As illustrated, the tramper mechanism includes a box-like frame 11 which is positioned over a pallet 13 upon which the cotton module will be positioned. The frame is shown in its raised position for transportation from one place to another by means of a suitable tractor 15. The frame is connected to the tractor by means of a hitch member 28 which projects forwardly from the frame for attachment ot the drawbar of the tractor 15. The frame includes side walls 17 which are sloped toward one another so that the walls are closer together at the top of the frame than they are at the bottom of the frame, as best seen in FIG. 2. The inside of each side wall preferably has a lining of sheet metal to provide a smooth surface. Frame support members 19 provide rigid support for the side walls 17. At the bottom of each of the side walls and the end wall 21 are longitudinal runners 23 which are rigidly secured to the support members 19 to support the frame 11 on the surface of the ground when the wheels 25 are retracted. At the top of the frame the side walls 17 diverge outwardly so as to form a funnel for receiving the cotton which is dumped into the interior of the frame. At the top of the diverging side wall portion 18 are positioned rails 27 which support the carriage, generaly designated by the numeral 29, for longitudinal movement with respect to the frame.

The carriage moves on the rails 27 by means of a number of rollers 31 as will be more fully appreciated hereinbelow. The carriage 29 is mounted on the frame 11 so that when the compactor is pressed against the cotton, the carriage is prevented from moving upwardly away from the frame and at the same time is so mounted that the side walls of the frame are prevented from bulging outwardly. The carriage includes a pair of transverse base support members together with vertical support members 35.

Positioned for vertical movement with respect to the carriage is a compactor which includes a tramper footing 79 and at least two vertical guide bars 37. The vertical guide bars are forced to move in the vertical plane by means of a set of four guide rollers 39 at the top of the carriage and another set of guide rollers (not shown) at the lower end of the carriage 29. The guide rollers provide a relatively frictionless interface between the vertical guide bars of the compactor mechanism and the carriage. As illustrated, the piston and cylinder arrangement 41 is retracted within the frame so that the frame can be safely transported on public highways and through areas having low overhead power or telephone lines or trees. When the tramper mechanism is ready for operation, the piston and cylinder arrangement is raised, as illustrated by the dotted lines, so that the tramper footing of the compactor mechanism can be raised to a position proximate the top of the frame. The operation of the compactor mechanism and the hydraulically driven piston and cylinder arrangement will be discussed more fully hereinbelow.

At the closed end of the frame is a platform 43 having a chair 45 for the operator which may preferably include a safety override switch for preventing the accidental operation of the tramper mechanism when someone is not positioned in the chair 45. The manual controls for the hydraulic drive system are illustrated schematically at 47 and the reservoir 49 for holding the fluid for driving the various hydraulic pistons and cylinders of the tramper mechanism is illustrated secured to the end wall 21. Hydraulic conduits, generally designated by the numeral 51, are connected at one end to the manual control 47 and at the other end to the respective cylinders for raising and lowering the compactor mechanism, the wheels 25, the rear door or gate 53 and for moving the carriage 29 on rails 27 along the length of the frame 11.

The wheels 25 are rotatably connected to a frame member 55 which is reciprocally positioned within guide frame 57. A cylinder 59 is secured to the frame base runner 23 at one end and the piston rod 61 which reciprocates with respect to the cylinder 59 is connected to the wheel base frame 55. A pin locking arrangement 63 is provided for locking the wheels 25 in position when the frame 11 is raised with respect to ground for transportation.

The tailgate 53 is rotatably secured to the frame at the top thereof by means of an appropriate hinge means 65. The tailgate is, as illustrated in the solid lines, latched to the frame so that the tailgate does not open when the cotton within the frame is being compacted. When the frame is to be transported to another position, the latch members 67, which are rotatably secured to the tailgate 53 on each side of the gate, are released from the frame. A piston and cylinder arrangement 69 is provided for rotating the gate upwardly to a generally horizontal position so that the frame can be driven away from the formed cotton module. The cylinder 69 is fixedly secured at one end to a piston rod which reciprocates therein. The piston rod rotates the tailgate 53 with respect to the frame.

A shaft 73 extends across the rear end of the frame. This shaft has a sprocket 75 at each end thereof about which two roller chains 77 are drivingly positioned. The shaft and sprockets are driven by means of a hydraulic motor (not shown) which is operated forwardly and backwardly by the hydraulic tractor driven pump which is secured to the frame 11. The hydraulic motor and the hydraulic tractor driven pump may be of any suitable type known in the art.

Refer now to FIG. 2 which is a section view of the frame taken along the lines 2—2 of FIG. 1. The frame is shown positioned over a pallet 13 with the frame raised with respect to ground for transportation with respect thereto. The side walls 17 of the frame are shown inclined inwardly from bottom to top so that when the tramper frame is raised with respect to the formed cotton module, the side walls 17 will not bear against the cotton module and accordingly, the frame can be easily transported away from the module. At the top of the side walls is a divergent portion 18 which forms a funnel-like opening at the top of the frame so as to guide cotton being poured into the frame. The side walls 17, including the upper divergent portions 18 thereof, are rigidly supported by means of supports 19 which extend from the top of the frame to the bottom thereof. At the bottom of the frame are base support runners 23 which support the frame on the ground when the wheels 25 are in their retracted position.

Fixedly secured to the side walls 17 are a pair of rails 27 on each side of the frame. Positioned on the rails is the carriage 29 which is rotatably movable on the rails by means of rollers 31. Vertically movable with respect to the carriage 29 is the compactor mechanism which includes a tramper footing 79 which in the preferred embodiment extends from one side wall to the other side wall near the top of the frame, as illustrated. The tramper footing 79 is preferably in the range of 16 to 24 inches wide so that a reasonable quantity of cotton can be compacted in a given stroke. The tramper footing 79 is fixedly secured to two vertical guide bars 37 by any suitable means known in the art, such as welding. The guide bars 37, which preferably 4 × 8 inch tubes, are fixed with respect to one another at the top by means of an angle bar 81. The vertical guide bars 37 are guided with respect to the carriage 29 in a vertical plane by means of guide rollers 39 positioned at the top of the carriage and by means of a second set of guide rollers 40 at the bottom of the carriage. A piston and cylinder arrangement 41 provides the power for raising and lowering the tramper 79 and the vertical guide bars 37 with respect to the frame. The cylinder arrangement 41 is controlled by hydraulic fluid coupled thereto via conduits generally designated by the numeral 83.

Figure 3:
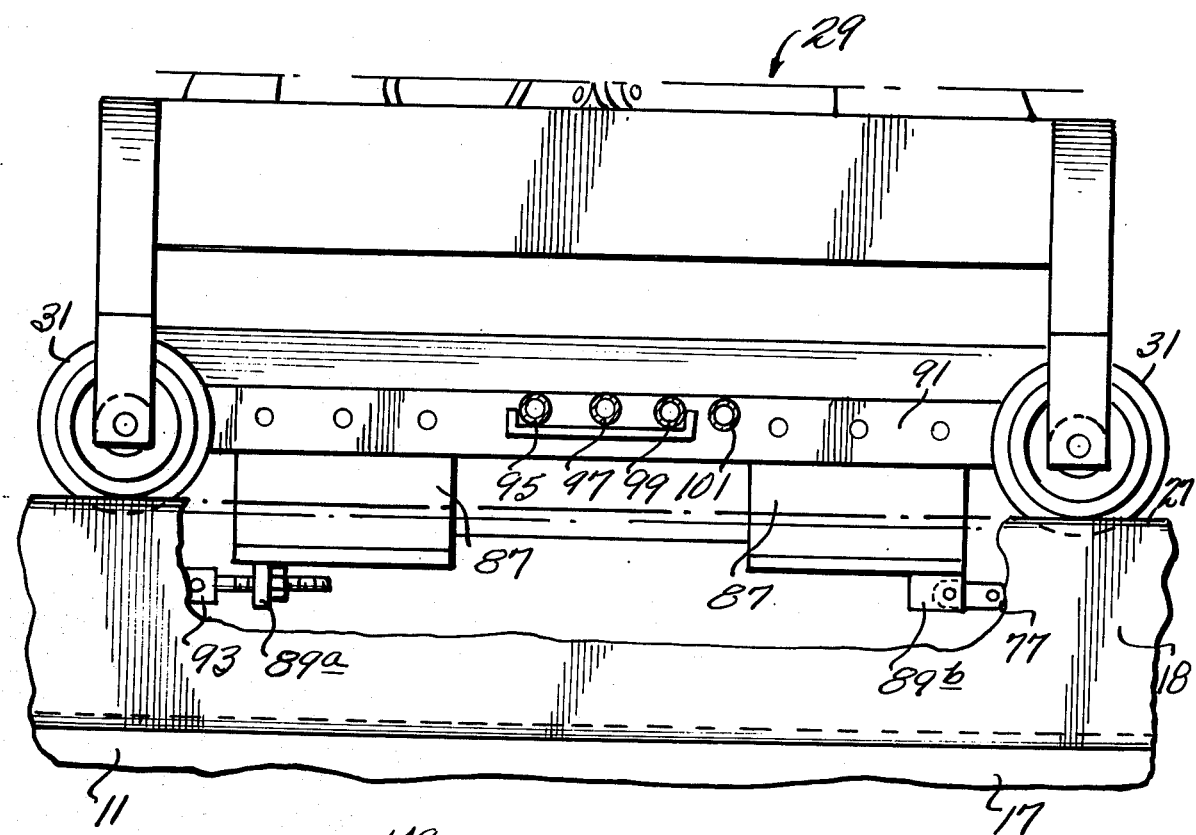
FIG. 3 is a fragmentary side elevation view of the tramper mechanism illustrating the carriage mounted on the rails of the frame.
Figure 4:
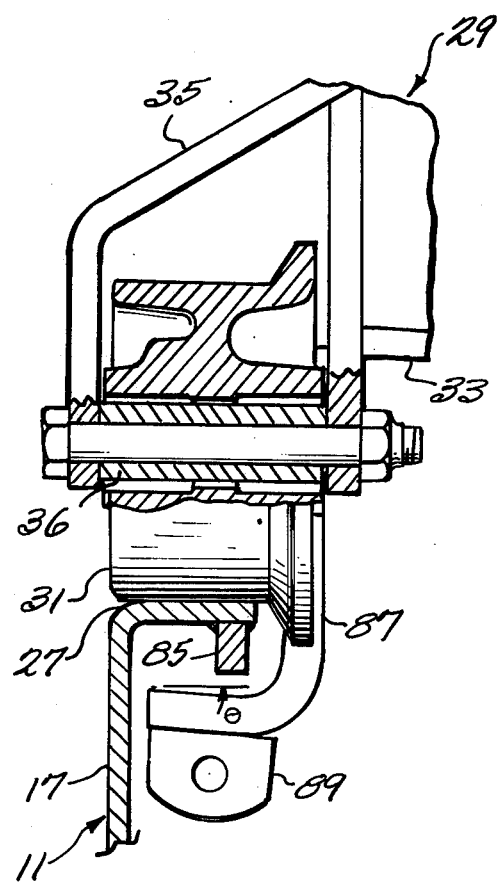
FIG. 4 is a fragmentary view of the carriage transport mechanism shown in partial section.

Refer now to FIGS. 3 and 4 which illustrate the manner in which the carriage 29 is mounted on the frame 11. With particular reference to FIG. 4, the carriage frame transverse support member 33 is terminated in a roller support portion 35. A roller 31, shown in partial cutaway, is rotatably secured to the roller support 35 by means of a nut and bolt having a bearing 36 positioned thereabout. The roller 31 rotates on a rail 27 which is fixedly secured to the side walls 17 of the frame and to the rigid vertical support members 19 shown in FIGS. 1 and 2. The rail as illustrated is bent inwardly at the top to form a surface on which the rollers make contact. In addition, the rail has a depending bar 85 which is fixedly secured to the rail and extends along the entire length of the frame. A bracket 87 is bolted to the carriage and extends downwardly therefrom to the underside of the rail 27. The bracket is bent upwardly under the frame to a predetermined angle θ, as illustrated. Connected to the underside of the bracket 87 is a lug 89 to which the chain 77, shown in FIG. 1, is secured. The purpose for the bracket 87 is to prevent vertical movement of the carriage with respect to the frame when the tramper footing is pressing against the cotton. If the bracket 87 did not communicate with the underside of the rail 27, the carriage mechanism could conceivably be raised upward and away from the frame when the cotton is being tramped. In addition, the bracket is bent upwardly to an angle θ so that when the cotton is being compressed both against the pallet 13 and against the side walls 17 of the frame, the bracket 87 limits the movement of the bar 85, and hence the rail 27, in an outward direction.

Refer now to FIG. 3 which is a side elevation view of a portion of the carriage of the present invention. The rollers 31 are shown positioned on the rails 27. The brackets 87 are shown bolted to the carriage along the longitudinal carriage support member 91 with the lugs 89 secured to the brackets 87. Lug 89(a) has a threaded eyebolt or other slack absorbing means extending therethrough with the end of the eyebolt connected to the transport chain 77 via a clevis member 93. The lug 89(b) is directly connected to the other end of the chain 77 via a suitable means known in the art. As illustrated, when the chain is moved by means of the sprocket 75, shown in FIG. 1, which in turn is driven by the hydraulic motor (not shown), the carriage is pulled along the rail 27.

The longitudinal support member 91 has a plurality of holes 95, 97, 99 and 101 through which hydraulic fluid conduits extend from the cylinder to the conduits 51 which are secured to the outside of the frame, as illustrated in FIG. 1. Through holes 95 and 97 extend conduits which couple fluid from the fluid pump to the upper portion of the cylinder 41 and hole 99 receives a conduit for coupling fluid to the lower portion of the cylinder 41. Hole 101 receives a conduit for conducting leakage fluid away from the cylinder to the external portion of the frame.

Figure 5:
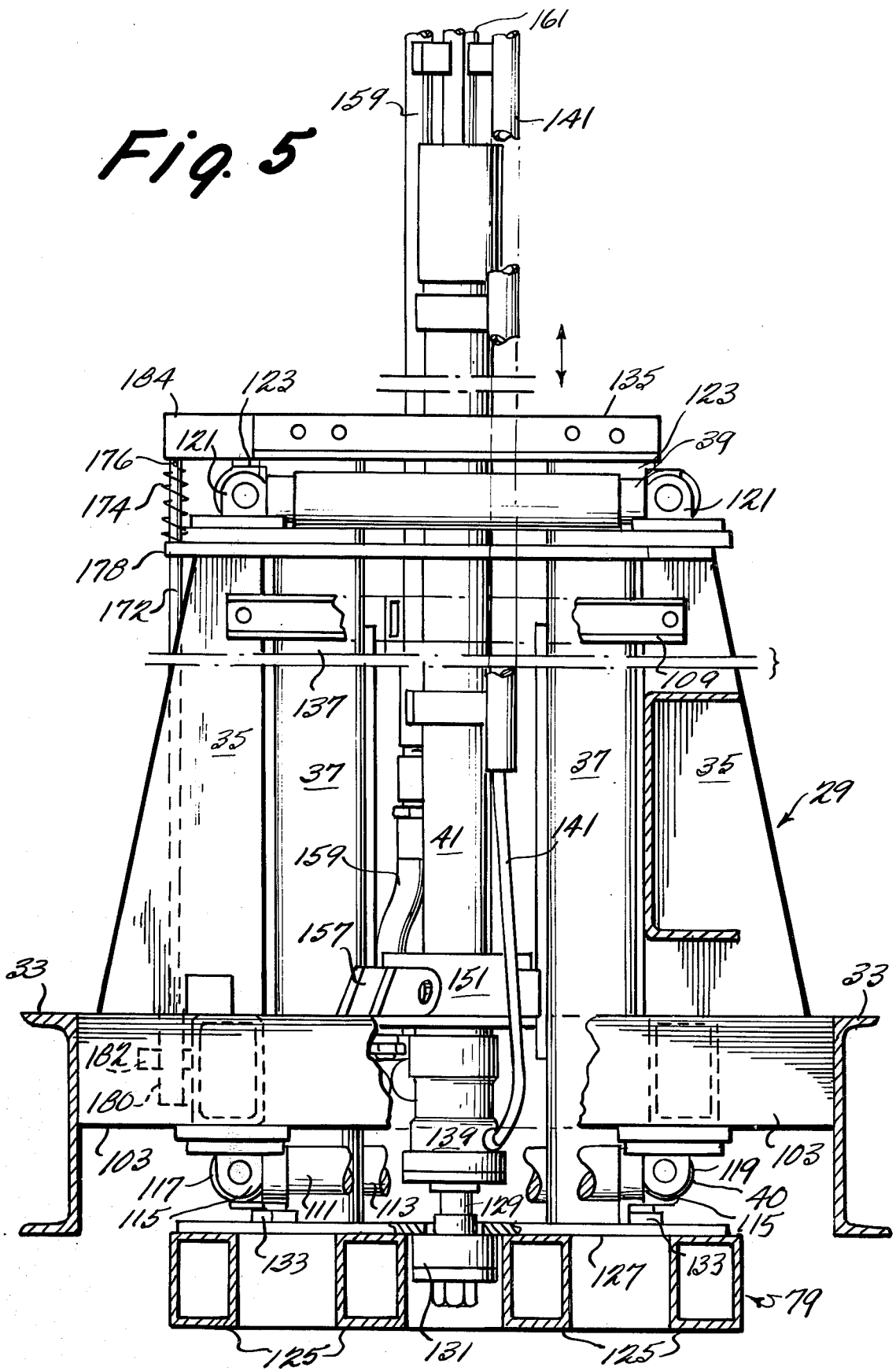
FIG. 5 is a side elevation view shown in partial section of the carriage and the piston and cylinder arrangement of the tramper mechanism.

Refer now to FIG. 5 which is a side elevation view of the carriage and the piston and cylinder arrangement of the present invention. In the figure the tramper footing 79 is shown in its uppermost raised position and the upper portion of the cylinder is shown in its retracted position to facilitate the description of the carriage assembly. However, as will be more fully appreciated hereinbelow, the tramper footing will never be in a raised position with respect to the frame when the cylinder is in its retracted position. The carriage is shown having a pair of transverse support members 33 which extend across the width of the frame, as best illustrated in FIG. 2. The transverse support members are joined by means of a pair of longitudinal support members 103 which are fixedly secured to the members 33 by a suitable means such as welding. The first and second vertical support members 35 are each secured to the longitudinal support members 103 at their lower end and are each joined together at their upper end by means of an angle iron support 109. The guide rollers 40 which include a pair of longitudinal guide rollers 111 and 113, respectively, and transverse guide rollers 117 and 119, are rotatably secured to guide roller supports 115. At the upper portion of the carriage mounted on the vertical supports 35 is a second pair of longitudinal and transverse guide rollers 39 which are secured to the supports 35 by means of a second pair of guide roller supports 121. Fixedly secured to the vertical support members 35 are stops 123 which define the lower limit in which the compactor mechanism can travel.

Figure 12:
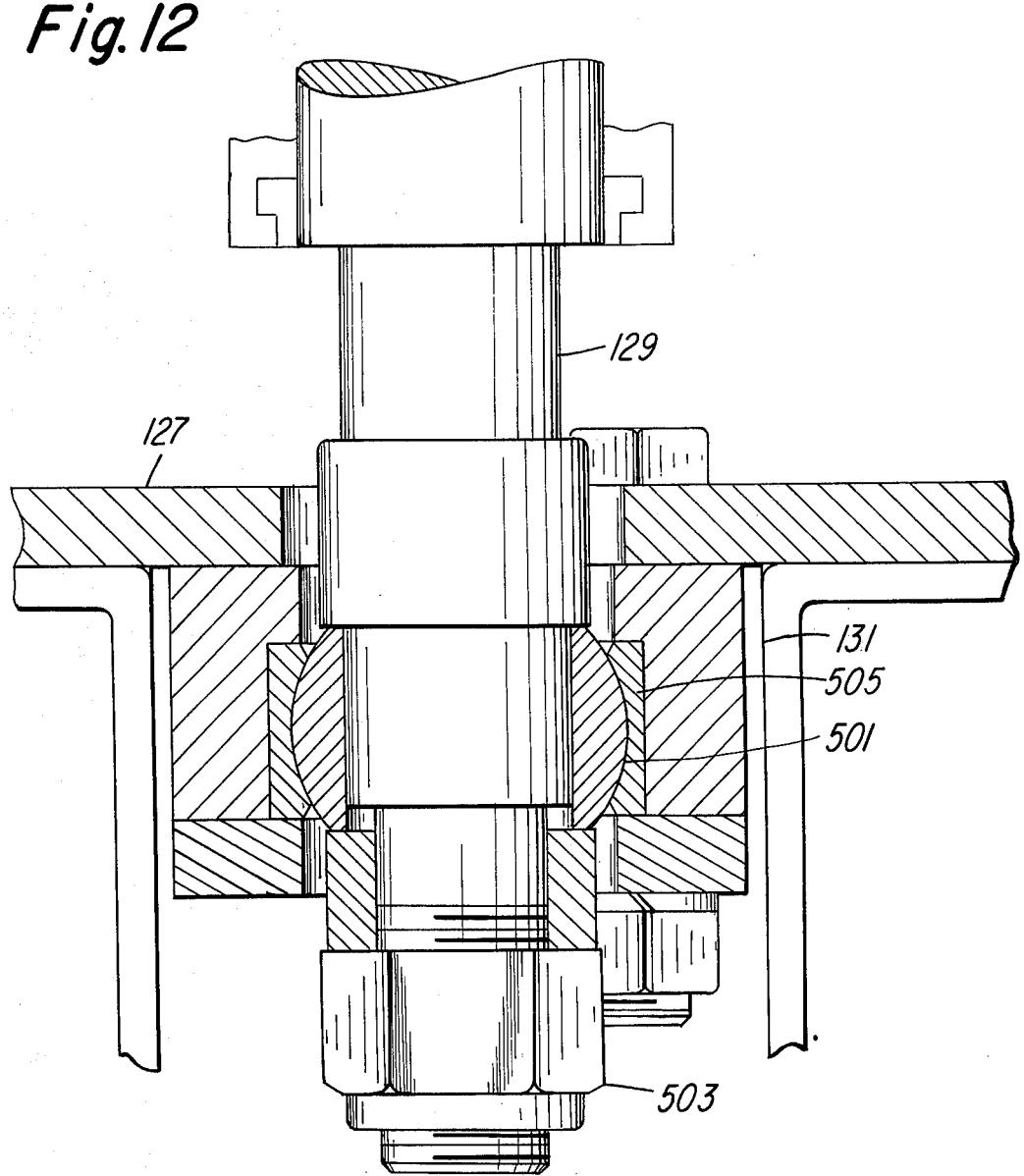
FIG. 12 is a section view of the spherical bearing for the tramper footing.

The compactor mechanism includes a tramper footing 79 which includes a number of tubes 125 which are joined together to form the tramper footing by means of a plate 127. The tramper footing 79 is shown secured to the piston rod 129 by means of a spherical bearing which is enclosed in a bearing housing 131. An example of the type of spherical bearing used is disclosed more fully in FIG. 12 and is utilized in order to insure that the counter force directed against the tramper footing by the cotton in the frame is directed along the piston rod 129 in a vertical direction. With reference to FIG. 12, a spherical bearing 501 is shown positioned about the rod 129. The bearing is secured in place by means of a bolt 503 threaded onto the end of the piston rod 129. Positioned in the bearing housing is a bearing race 505 in which the bearing 501 rotates. The bearing race 505 is secured in position within the housing 131 so that forces directed against the tramper footing are directed along the longitudinal axis of the rod 129 to thereby eliminate bending forces on the rod 129. As illustrated, the piston rod 129 is retracted to the maximum extent posssible into the cylinder 41. A stopper 133 is secured to the lower end of the carriage frame and provides an upper limit for the movement of the tramper footing 79. As illustrated in the figure, the tramper footing is raised to the position where it contacts the stopper 133.

Two steel tubes 37, which form vertical guide bars, are fixedly secured to the tramper footing by a conventional means such as, for example, a weld. These bars are connected at their upper ends by means of an angle iron 135. The vertical guide bars bear laterally against the lower guide rollers 40 and against the upper guide rollers 39. Thus, the guide rollers 39 and 40 permit relatively frictionless movement of the tubes 37 within the carriage structure and in addition these guide rollers maintain the movement of the tramper footing in the vertical direction so that undue lateral stresses are not induced into the piston and cylinder arrangement 41.

The upper angle iron support 135 is shown positioned against stop 123. In the preferred embodiment, when the tramper footing is raised to the position shown in the figure, the angle iron 135 will be raised approximately 6 feet above the stops 123. However, for purposes of illustration, the vertical guide bars 37 are segmented at 137 so that FIG. 5 shows the manner in which the angle support 135 bears against the stop 123 when the compactor tramper footing is extended the maximum length of its stroke or when the cylinder is retracted within the frame and how the tramper footing 79 bears against the stops 133 at the lower end of the carriage when the tramper footing is in its maximum raised position.

Figure 7:
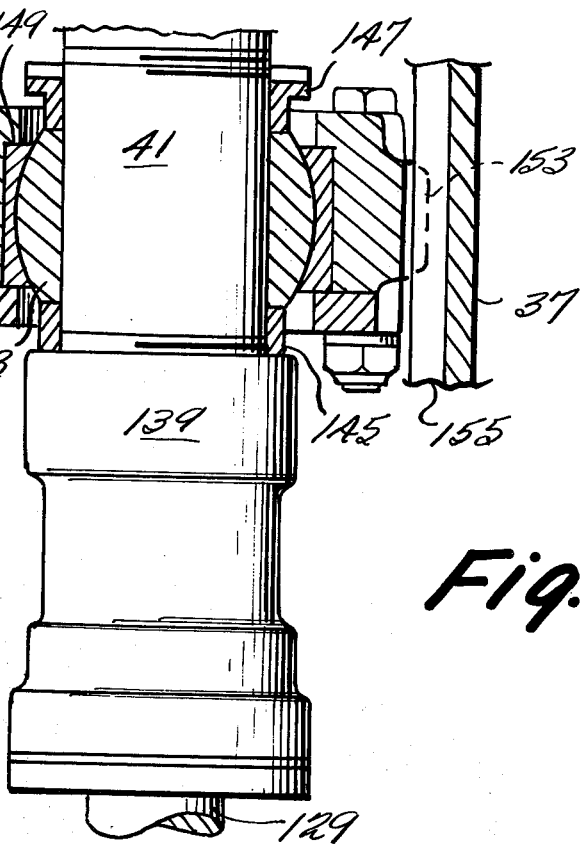
FIG. 7 is a partial section view taken along the lines 7—7 of FIG. 6 illustrating the spherical bearing connection of the cylinder to the carriage mechansim.

The piston and cylinder arrangement includes a cylinder 41 which is terminated in its lower end by a rod end head 139 which, as will be discussed more fully hereinbelow, provides a means for communicating fluid under pressure to the lower end of the piston and in addition provides a means for conducting leakage fluid away from the cylinder via conduit 141. The cylinder is connected to a cast box 151 by means of a spherical bearing as best illustrated in FIG. 7. The spherical bearing is positioned about the cylinder 41 between a bushing 145 and a nut 147. The nut is secured to the cylinder by means of threading the nut about the cylinder. An annular bearing race 149 is positioned about the external periphery of the spherical bearing 143 and is secured to a cast box 151, as illustrated. The cast box 151 has a pair of split ears 153. The split ears 153 each receives a key 155 which is mounted by means of a weld to the vertical guide bars 37 of the compactor mechanism. Each key 155 is aligned in the vertical direction and the split ear-key arrangement is for the purpose of maintaining the ears 158 of cast box 151 (see FIG. 6) in rotational alignment with the vertical guide bars 37.

The cast box which is secured to the cylinder 41 by means of the spherical bearings 143 is fixed in an operative position with respect to the carriage housing by means of at least two locking bars 157, the structure of which will be more fully explained in connection with the discussion of FIG. 6. The locking bars 157 thus maintain the cylinder fixed in the position shown in FIG. 5 so that the tramper footing 79 and the piston rod 129 can reciprocate with respect to the frame and the carriage. However, as will be more fully explained hereinbelow, when the cast box 151 is freed from the locking bars 157, the cylinder 41 is permitted to move vertically with respect to the carriage so that the upper portion of the cylinder can be retracted into the frame for the purpose of permitting easy transportation of the tramper mechanism of the present invention from one place to another.

A leakage conduit 141 is coupled to the cylinder via the rod end head 139 at the lower portion thereof. This conduit passes upwardly over the top of the carriage and then is passed outwardly over the side of the frame via hole 101 through the longitudinal support 91 in the carriage illustrated in FIG. 3. In addition, fluid under pressure can be conducted into and out of the lower end of the piston and cylinder arrangement via a conduit 159 which also is coupled to the lower end of the cylinder via the rod end head 139. The manner in which fluid under pressure is conducted to and from the lower portion of the cylinder 41 will be more fully explained hereinafter in connection with the discussion of FIG. 11. At the top of the cylinder 41 another conduit 161 is provided for conducting fluid into the top of the cylinder under a high pressure and out of the top of the cylinder under a low pressure.

Figure 6:
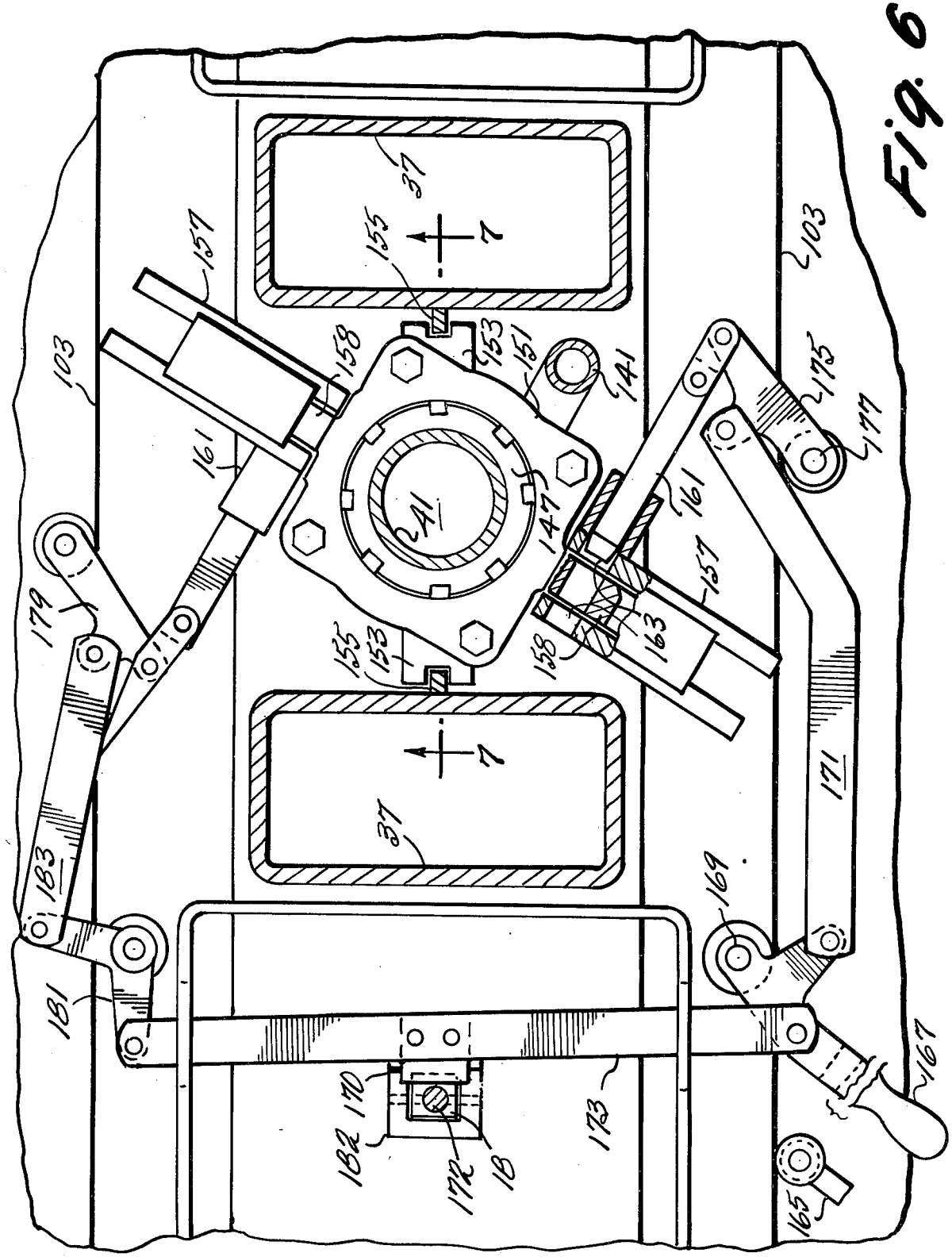
FIG. 6 is a section view showing the safety latch mechanism for the hydraulic piston and cylinder arrangement of the tramper mechanism.

Refer now to FIG. 6 which is a section view of the latch mechanism for the cylinder of the present invention. As illustrated in FIG. 6, the vertical guide bars 37 of the compactor mechanism each has a vertical key bar 155 fixedly secured thereto which key bar extends over a substantial portion of the length of the vertical guide 37. The cylinder 41 is shown cut away with the piston rod within the cylinder not shown. The nut 147 for securing the spherical bearing 143 (shown in FIG. 7) is shown positioned about the external periphery of the cylinder 41. The cast box 151 is shown having a plurality of bolts extending through the top thereof which bolts are for the purpose of securing the bearing race 149 in position. Formed integral with the cast box 151 is a pair of split ears 153 each of which has a recess therein for receiving the key bar 155. As aforementioned, the key bar 155 and split ear 153 arrangement is for the purpose of maintaining the ears 158 in alignment with the vertical guide 37 and with the carriage 29 when the cylinder 41 is released from its operative position as shown in FIG. 5 and retracted into the frame of the cotton tramper. The ears 158 are formed integral with the cast box 151. These ears each have a slot therethrough for receiving a locking pin 161. Mating with the ears 158 are a pair of locking bars 157 which are rigidly secured to the longitudinal support bars 103 at each side of the carriage. These locking bars form a slot into which ears 158 are received and each locking bar has a pair of aligned holes 163 therethrough for receiving the locking pins 161. Under normal operating conditions the locking pins 161 are inserted through the slots in the ears 159 and through the holes 163 in the locking bars to thereby maintain the cylinder in the operative condition illustrated in FIG. 5. However, when it is desired to retract the cylinder into the frame, a spring biased latch pin 165 is released to thereby permit the rotation of a handle 167. Handle 167, when rotated counterclockwise about pivot point 169, causes arms 171 and 173 to move with the handle. This movement in turn causes a coupling pin 175 to rotate about pivot pin 177 to free the locking pin 161 from the ear 158 as illustrated. In addition, movement of arm 173 causes the coupling pin 179 to rotate in a clockwise direction via coupler 181 and arm 183 to thereby free the other locking pin 161 from the ear 158.

Because of the weight of the tramper footing 79, the vertical guide bars 37, the piston rod 129 and the cylinder 41, it is important that the locking pin 161 be retained in the ears 158 until the tramper footing 79 has been lowered to such a point that the angle iron 135 rests against stop 123 of the carriage. The position of the upper portion of the cylinder 41 and the vertical guide bars 37 in the carriage 29 is illustrated in the portion of FIG. 5 above the segmenting lines 137. Thus, when the angle iron 135 is resting on the stop 123, the tramper foot 79, the vertical guide bars 37 and the piston and cylinder arrangement are not capable of a sudden downward acceleration which might damage the tamper mechanism. In order to insure that the locking pins are not released before the angle iron 135 has come to rest on the stops 123, a safety latch mechanism is provided which will now be described with reference to FIGS. 5 and 6. As illustrated in FIG. 6, the arm 173 has a lug 170 secured thereto. When the angle iron 135 is in its raised position away from the stop 123, a rod 172 is raised under the bias of a spring 174, the spring being positioned between a cotter pin 176 and a plate 178 secured to the vertical carriage supports 35. At the opposite end of the rod is affixed a square rod 180 which is movable in a guide member 182. With the rod 172 biased upward by the spring 174, the square rod portion 180 blocks the movement of the arm 173 so that the handle 167 cannot be rotated to release the locking pins 161. However, when the angle iron 135 is lowered to abut against the stops 123, a bracket 184 attached to the angle iron forces the rod 172 downward until the square rod portion 180 thereof moves below an abutting relationship with the lug 170. Thus the arm 173 is free to move under the rotational force provided by moving the handle 167. Thus, the locking pins cannot be released from the ears 153 of the cylinder until the angle iron 135 has come to rest on the stops 123.

Refer now to FIGS. 8 and 9 which illustrate a means for limiting the rotation of the cylinder within the spherical bearing. It is important that the cylinder 41 be limited from rotating more than a few degrees in either direction so that the fluid conduits 141 and 159 do not become twisted within the carriage. Thus, referring to FIG. 8, there is illustrated the rod end head 139 having the piston rod 129 extending therefrom. The rod end head terminates in a cast box 151 which is secured to the carriage frame by means of locking bars 157, as was explained in connection with FIGS. 5 and 6. The cylinder 41 extends above the cast box 151 and terminates in an upper fluid conduit 161 which in the preferred embodiment is a pipe but may be of a flexible material. Secured to the rod end head 139 is an outlet elbow 187 to which is coupled a hydraulic pipe 159 which communicates fluid under pressure with respect to the lower end of the cylinder. The hydraulic pipe 159 passes upward, generally parallel to the cylinder 41, and is coupled at its top to a flexible hose 189. A bracket member 191 is secured about the cylinder by means of a set of nuts and bolts as best seen in FIG. 9. The bracket member 191 is connected at one end to the hydraulic pipe 159 and is connected at the other end to the low pressure drain hose pipe 141. The hydraulic pipe 159 is connected to brackets 191 by a suitable means such as a weld. A pipe guide casting 193 having a pipe receiving groove therein for receiving the hydraulic pipe 159 is secured to a bushing 195 or may be formed integral therewith. The bushing 195 is rotatably secured to a longitudinal support member 109 by means of a pin 197. The bushing 195 has an arm secured thereto which extends outwardly from the bushing for receiving a bolt 199. The bolt is spring biased by means of a spring 201 so that movement of the cylinder in a counterclockwise direction is inhibited. If desired, a second bolt can be positioned through the hole 203 which bolt would also be spring biased. This would inhibit rotation of the cylinder in the opposite clockwise direction. On the other side of the cylinder the low pressure drain hose pipe 141 is inhibited from rotational movement by a similar spring biased bushing arrangement.

Figure 10:
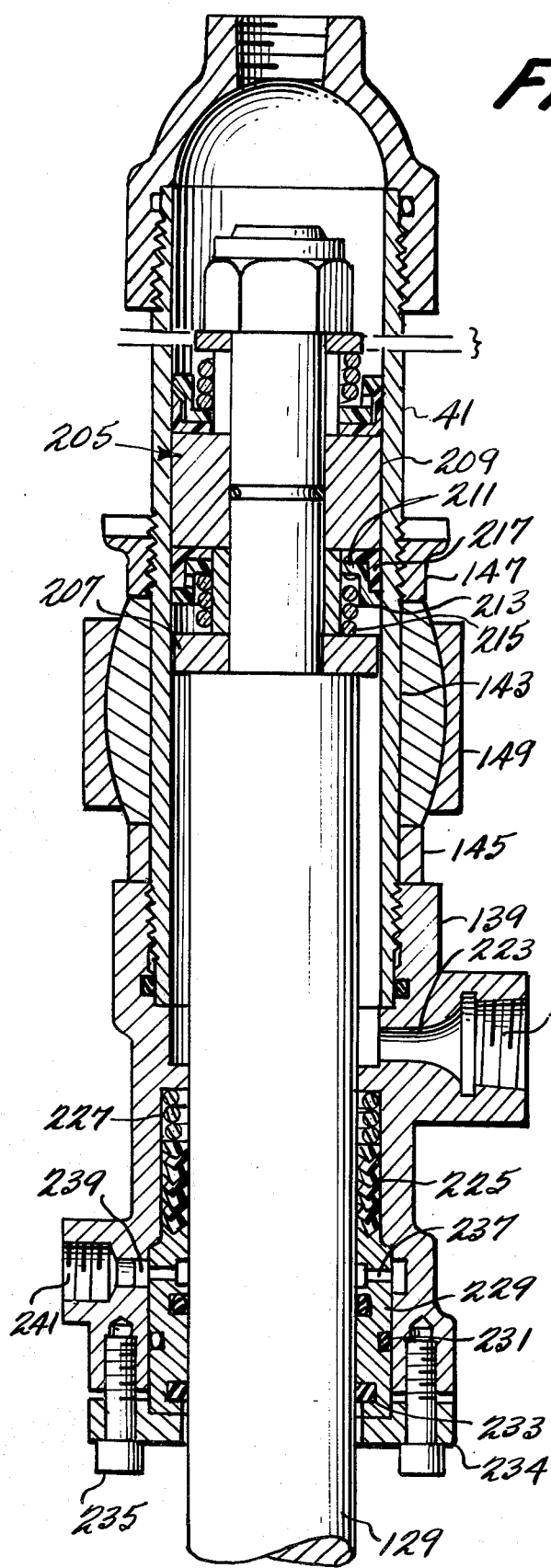
FIG. 10 is a section view of the cylinder and piston arrangement of the present invention.

Refer now to FIG. 10 where there is disclosed a section view of the piston and cylinder arrangement of the present invention. Cylinder 41 is shown having the rod end head 139 threadably connected thereto. Positioned about the cylinder above the rod end head is a bushing 145, a spherical bearing 143 having a bearing race 149 mating therewith with the bushing 145 and bearing 143 secured in position by means of a nut 147 threadably secured to the cylinder. The cylinder is shown broken away near the top because of the length thereof. At the top of the cylinder a cap is threadably secured to the cylinder with an O-ring seal for preventing the leakage of fluid to the outside of the cylinder. A piston rod 129 is shown positioned within the cylinder, the piston rod terminating in a piston portion generally designated by the numeral 205. The piston includes a first pressure bearing member 207 which is spaced from a second pressure bearing member 209 by means of a sealing arrangement which includes a bushing 211 and an annular cup-shaped spring retaining member 213 which is spring biased toward the piston member 205 by means of a spring 215. The annular cup-shaped retaining member 213 has a hole therethrough for permitting fluid to pass through the hole to force a flexible sealing member 217 against the side walls of the cylinder and against the piston member 209. A similar arrangement is provided on the upper portion of the piston member 205 for providing a fluid tight seal to thereby prevent fluid from the lower portion of the cylinder from escaping around the piston member 209 to the upper portion of the cylinder and vice versa. The pressure bearing members 207, 209 and the associated sealing mechanism are fixedly secured to the piston rod by means of a nut and bolt arrangement.

At the lower end of the cylinder a first port 221 is provided for communicating fluid under pressure with an internal recess 223 in the cylinder. The fluid conducted under pressure through port 221 controls the rate of movement of the piston rod in a downward direction and in addition forces the piston rod upward, depending upon the pressure level of the fluid coupled to the internal recess 223. Below the recess 223 is a second recess into which is positioned a high pressure packing seal 225 which is spring biased into position by means of a compression spring 227. The high pressure packing seal prevents the fluid in the recess 223 from escaping downward between the piston rod and the cylinder to the outside of the cylinder. Below the high pressure packing seal is a bronze packing gland 229 which has a lip at the upper end thereof on which the high pressure packing seal 225 is seated. The bronze packing gland has a low pressure seal 231 in the form of an O-ring extending about the internal periphery thereof. Near the bottom of the packing gland is a scraper-wiper 233 for cleaning dirt from the piston rod as it enters the cylinder, thereby preventing excessive wear and tear on the cylinder and piston and sealing mechanism. The packing gland 229 is maintained in position by means of a bushing 234 which is secured to the rod end head by means of a plurality of screws 235. The packing gland also includes a plurality of channels extending radially therethrough for receiving oil which might escape past the high pressure packing seal 225. This oil is received in a reservoir 239 which communicates with a second outlet port 241 which communicates with the low pressure outlet hose 141. Thus, if the packing seals 225 become damaged or worn, excessive hydraulic fluid will flow therepast into the reservoir 239 through the channels 237. This fluid will flow out through port 241 and into low pressure hose 141. The fluid is then carried upward and away from the cylinder and carriage and is permitted to discharge on the outside of the frame. Thus leakage fluid cannot drip onto the cotton which is being formed into a module.

An adjustable hydraulic cushion (not shown) is provided to slow the piston for a shock-free stop on the high speed up stroke of the piston. The hydraulic cushion is not illustrated since such cushions are well known in the art and in order to more clearly and concisely present the novel features of the subject invention.

Figure 11:
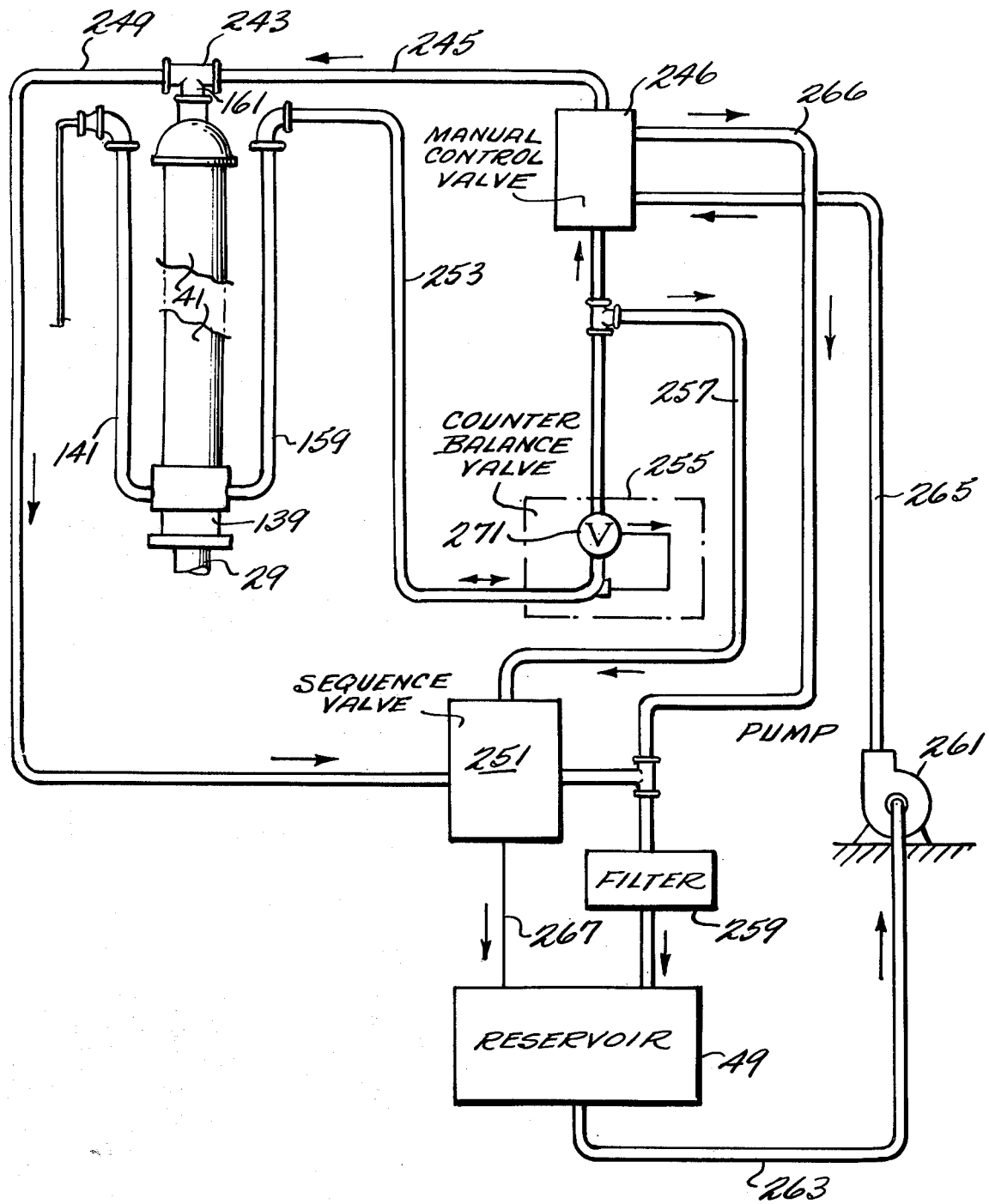
FIG. 11 is a schematic diagram of the hydraulic system of the present invention.

Refer now to FIG. 11 which is a schematic illustration of the hydraulic pump system of the present invention. The cylinder 41 is shown broken away with the top portion thereof being connected to a tee 243 via pipe 161. To the tee 243 is connected a first fluid conduit 245 which is preferably of a flexible material so that it can move with the carriage as the carriage reciprocates on the frame and so that the conduit can flex with the cylinder as the cylinder is moved up and down within the frame. The conduit 245 is coupled to a manual control valve 247. The tee 243 also has second hydraulic hose 249 connected thereto which is also of a flexible construction. This hose is connected at its other end to a sequence valve 251. At the lower portion of the cylinder, i.e., at the rod end head 139, is connected a hydraulic pipe 159 which extends upward generally parallel to the cylinder to the top thereof where the pipe 159 is connected to a flexible hose 253. The flexible hose 253 is coupled to a counterbalance valve 255. The other end of the counterbalance valve 255 is coupled to the manual control valve 247 and to a sequence valve 251 via a rigid control line 257. The output of the sequence valve 251 is connected by means of a hydraulic hose to the hydraulic fluid reservoir 49 via a filter 259. A fluid pump 261 for pressurizing the fluid receives fluid from the reservoir via a hydraulic hose 263. The output of the pump 261 is coupled to the manual control valve 247 via a hose 265.

In operation, assume for example that the piston within the cylinder 41 is to be driven downwardly so as to compact cotton within the frame. When this occurs, fluid under pressure from the pump 261 is coupled to the manual control valve which connects the fluid conduit 265 to the fluid conduit 245. Thus, fluid is coupled to the upper portion of the cylinder 41 via tee 243 and conduit 161. In the meantime, fluid in the lower portion of the cylinder underneath or below the piston 205 of FIG. 10 is forced out of the cylinder via hydraulic hose 159 and flexible conduit 253. This fluid is coupled through a restriction valve 271 in the counterbalance valve 255 to the manual control valve 247. The purpose for the restriction valve 271 is to apply a back pressure to the fluid egressing from the cylinder via hydraulic pipe 159 so as to neutralize the weight of the tramper footing 79, the vertical guide bars 37 and the piston rod 129. Thus, the tramper 79 does not rapidly fall at an accelerated rate under the pressure of the fluid being coupled to the upper portion of the cylinder but rather the downward movement of the piston rod 27 and the tramper footing 79 is at a controlled rate. The restriction valve 271 may be of any suitable type known in the art but operates to apply a back pressure to fluid flowing from conduit 253 to the manual control valve while permitting the free flow of fluid in the opposite direction.

While fluid is being coupled under pressure to the upper portion of the cylinder 41, the sequence valve 251 is closed. The sequence valve is a pressure-sensitive valve of conventional design which is responsive to the pressure levels of the counterbalance valve 255 wherein the pressure levels at the output of the counterbalance valve 255 is coupled to the sequence valve via conduit 257. Thus with the sequence valve 251 closed, fluid cannot pass through conduit 249 to the reservoir 49.

Now assume that the tramper 79 is to be raised in the frame. Accordingly, fluid under pressure is coupled to the lower portion of the cylinder 41. In this case, fluid under pressure from pump 261 is coupled to the manual control valve 247 which is set up so that fluid is conducted to the counterbalance valve 255, which permits the free flow of the fluid therethrough, and then to the flexible hose 253 and the hydraulic hose 159. At the same time while the piston is moving upward in the cylinder 41, fluid in the upper portion of the cylinder must egress quite rapidly therefrom. The reason for this is that the internal area within the cylinder in which the hydraulic fluid acts on the piston is nearly three times as great in the upper portion of the cylinder as in the lower portion of the cylinder. Accordingly, two exit lines 245 and 249 are provided for the fluid. Thus the fluid egressing from the upper portion of the cylinder passes out through pipe 161 and tee 243 to lines 249 and 245. The fluid passes from conduit 249 through the sequence valve 251 which is now open since the pressure in line 257 is high, to the reservoir 49 via a filter 259. The fluid also passes through hydraulic hose 245, through manual control valve 247 and hose 266 to the filter 259 and reservoir 49.

Another manual valve (not shown) connected to the pump and reservoir in parallel with the valve 247 controls the hydraulic motor at the rear of the frame for controlling the movement of the carriage with respect to the frame. Line 267 is a leakage conduit extending from the sequence valve to the reservoir. As aforementioned, low pressure hose 141 receives leakage fluid from the lower portion of the cylinder and conducts this leakage fluid to the exterior of the frame. Thus, as illustrated in FIG. 11, a hydraulic control system is provided which accurately and efficiently controls the movement of the piston within the cylinder 41 and in addition, because of the counterbalance valve 255, controls the rate of downward movement of the piston within the cylinder.

The preferred embodiment of applicant's invention described hereinabove provides an efficient and reliable means for forming cotton modules. The tramper mechanism is safe and requires a minimum of manual labor for forming the modules and hence is a substantial improvement over prior art designs. However, while the invention has been disclosed in connection with a preferred embodiment, it should be understood that there may be other obvious modifications of the invention which fall within the spirit and scope of the invention as defined by the appended claims.

What is claimed is:

1. A tramper mechanism for forming cotton modules comprising:
    a frame having opposed side walls and openings at the top and bottom thereof, said frame having a closable door forming the rear wall thereof,
    a carriage mounted on said frame at the top thereof between said opposed side walls, said carriage being movable along the longitudinal length of said frame,
    a tramper footing vertically movable with respect to said carriage and extending transversely across said frame between said side walls, said tramper footing compacting cotton within said frame to thereby form a cotton module,
    hydraulic means releasably fixed to said carriage in an operational position for raising and lowering said tramper footing with respect to said carriage, said hydraulic means including a hydraulic cylinder releasably fixed with respect to said carriage, a piston rod secured at one end to said tramper footing and mounted in said cylinder for reciprocal movement with respect thereto, a piston means reciprocably positioned in said cylinder and connected to the other end of said piston rod, means for moving said piston longitudinally in said cylinder, means for directing the force generated by said cylinder against said piston along the center line of said piston and cylinder, said directing means comprising a first spherical bearing means for joining said piston rod to said tramper footing;
    latching means for releasing said hydraulic means from said operational position to a retracted position within said frame to thereby permit the transportation of said tramper mechanism from one place to another; and
    safety means for enabling said latch releasing means when said tramper footing is at its lowest operational position, said safety means inhibiting said latch releasing means when said tramper is raised with respect to said lowest operational position.

2. The tramper mechanism for forming cotton modules of claim 1 wherein said means for directing the force generated by said cylinder against said piston along the center line of said piston and cylinder further includes a second spherical bearing means for joining said cylinder to said carriage, said spherical bearing means directing the forces generated on said piston in said cylinder in a vertical direction.

3. A tramper mechanism for forming cotton modules comprising:
    a frame having opposed side walls and openings at the top and bottom thereof, said frame having a closable door forming the rear wall thereof,
    a carriage mounted on said frame at the top thereof between said opposed side walls, said carriage being movable along the longitudinal length of said frame,
    a tramper footing vertically movable with respect to said carriage and extending transversely across said frame between said side walls, said tramper footing compacting cotton within said frame to thereby form a cottom module,
    hydraulic means releasably fixed to said carriage in an operational position for raising and lowering said tramper footing with respect to said carriage, said hydraulic means including a hydraulic cylinder releasably fixed with respect to said carriage, a piston rod secured at one end to said tramper footing and mounted in said cylinder for reciprocal movement with respect thereto, a piston means reciprocably positioned in said cylinder and connected to the other end of said piston rod, means for moving said piston longitudinally in said cylinder, means for directing the force generated by said cylinder against said piston along the center line of said piston and cylinder, said directing means comprising a first spherical bearing means for joining said piston rod to said tramper footing;
    latching means for releasing said hydraulic means from said operational position to a retracted position within said frame to thereby permit the transportation of said tramper mechanism from one place to another;
    stopper means secured to said carriage for limiting the downward movement of said tramper footing, and
    safety means for enabling said latch releasing means when said tramper footing is at its lowest operational position, said safety means inhibiting said latch releasing means when said tramper is raised with respect to said lowest operational position.

4. The tramper mechanism for forming cotton modules of claim 3 further comprising guide means for guiding said tramper in a vertical plane, said guide means comprising rigid means fixedly secured to said tramper footing at one end thereof and to a stop member at the other end thereof, said rigid means extending in a vertical direction from said tramper footing to said stop member so that said stop member engages said stopper means on said carriage when said tramper footing is in its lowest operational position, and rotatable guide means for restricting the movement of said rigid means to a vertical plane when said tramper footing is being raised and lowered, said rotatable guide means providing a relatively frictionless movement of said guide means with respect to said carriage.

5. The tramper mechanism for forming cottom modules of claim 4 further comprising means for preventing the fluid in said cylinder from leaking onto said cotton.

6. The tramper mechanism for forming cotton modules of claim 5 wherein said means for preventing the leakage of fluid from said cylinder onto said cotton comprises a first high pressure packing gland positioned in the inside periphery of said cylinder between said cylinder and said piston rod, said packing gland being positioned between the lower extremity of said cylinder and said piston, a low pressure packing seal positioned about said piston rod between said high pressure packing gland and the lower extremity of said cylinder, and reservoir means extending about the inside periphery of said cylinder between said high pressure and low pressure packing glands, said reservoir communicating with a fluid carry-off means wherein fluid leaking past said high pressure packing gland to said reservoir is conducted away from said cylinder and said frame.

7. The tramper mechanism for forming cotton modules of claim 6 further comprising means for moving said carriage longitudinally with respect to said frame.

8. The tramper mechanism for forming cotton modules of claim 7 wherein said carriage moving means further comprises a pair of rails positioned on each side of said frame, a plurality of wheels rotatably connected to said carriage for rolling on said rails, and means for moving said carriage on said rails with respect to said frame.

9. The tramper mechanism for forming cotton modules of claim 8 wherein said carriage includes at least two vertical stop brackets for engaging the underside of said rails when said carriage is raised with respect to said frame by the force of said tramper footing acting against said cotton in said frame.

10. The tramper mechanism of claim 9 wherein said rails include a bar extending along substantially the entire longitudinal length thereof, said bar being fixedly secured to the underside of said rail and wherein said vertical lift brackets secured to said carriage cooperate with said bar to prevent said side walls of said frame from moving outwardly with respect to one another when said cotton is being compacted in said frame.

11. The tramper mechanism for forming cotton modules of claim 9 further comprising means for limiting the rotation of said cylinder with respect to said carriage.

12. The tramper mechanism for forming cotton modules of claim 11 further comprising a fluid reservoir, a pump, means for communicating fluid under pressure to the top of said piston when said tramper footing is being lowered, means for communicating fluid under pressure to the bottom of said piston when said tramper footing is being raised, and means for conducting fluid away from the upper portion of said cylinder above said piston when said piston is moving upward, said means for conducting fluid away from the upper portion of said cylinder including a first fluid conduit for conducting fluid away from said upper portion of said cylinder to said reservoir, and second auxiliary means for conducting the fluid away from said upper portion of said cylinder to said reservoir, said first fluid conduit and said second auxiliary means conducting fluid away from the upper portion of said cylinder at a faster rate than fluid under pressure is conducted to the botton side of said piston when said tramper footing is being raised.

13. The tramper mechanism for forming cotton modules of claim 12 further comprising means for limiting the speed of the downward stroke of said tramper footing.

14. The tramper mechanism for forming cotton modules of claim 13 wherein said means for limiting the speed of the downward stroke of said tramper footing comprises a one-way restriction valve, said restriction valve providing a back pressure on the fluid leaving said lower portion of said cylinder to thereby provide a counter force for controlling the rate of downward motion of said piston, said counter force being substantially equal to the weight of said tramper footing and said piston rod, said one-way restriction valve permitting the free flow of fluid under pressure into said lower portion of said cylinder.

15. The tramper mechanism for forming cotton modules of claim 12, wherein said second auxiliary means for conducting the fluid away from upper portion of said cylinder to said reservoir further comprises a valve means responsive to the communication of fluid under pressure to the botton side of said piston when said tramper footing is being raised to connect a second auxiliary fluid conducting means between the upper portion of said cylinder and said reservoir, said second fluid conducting means and said first fluid conduit conducting fluid away from the upper portion of said cylinder at a faster rate than fluid under pressure is conducted to the bottom side of said piston when said tramper footing is being raised.

16. A tramper mechanism for forming cotton modules comprising:
   a frame having opposed side walls and openings at the top and botton thereof, said frame having a closable door forming the rear wall thereof,
   a carriage mounted on said frame at the top thereof between said opposed side walls, said carriage being movable along the longitudinal length of said frame,
   a tramper footing verticalaly movable with vertically to said carriage and extending transversely across said frame between said side walls, said tramper footing compacting cotton within said frame to thereby form a cotton module,
   hydraulic means releasably fixed to said carriage in an operational position for raising and lowering said tramper footing with respect to said carriage, said hydraulic means including a hydraulic cylinder releasably fixed with respect to said carriage, a piston rod secured at one end to said tramper footing and mounted in said cylinder for reciprocal movement with respect thereto,
   a piston means reciprocally positioned in said cylinder and connected to the other end of said piston rod,
   means for moving said piston longitudinally in said cylinder, and
   means for directing a force generated against said piston substantially along the center line of said piston and cylinder, said force directing means including a first spherical bearing means for joining said piston rod to said tramper footing, guide means for guiding said tramper in a vertical plane, said guide means comprising rigid means fixedly secured to said tramper footing at one end thereof and to a stop member at the other end thereof, said rigid means extending in a vertical direction from said tramper footing to said stop member so that said stop member engages a stopper means on said carriage when said tramper footing is in its lowest operational position, and rotatable guide means for restricting the movement of said rigid means to a vertical plane when said tramper footing is being raised and lowered, said rotatable guide means providing a relatively frictionless movement of said guide means with respect to said carriage.

17. A tramper mechanism for forming cotton modules comprising:

a frame having opposed side walls and openings at the top and bottom thereof, said frame having a closable door forming the rear wall thereof between said opposed side walls, said carriage being movable along the longitudinal length of said frame, a tramper footing vertically movable with respect to said carriage and extending transversely across said frame between said side walls, said tramper footing compacting cotton within said frame to thereby form a cotton module, hydraulic means releasably fixed to said carriage in an operational position for raising and lowering said tramper footing with respect to said carriage, said hydraulic means including a hydraulic cylinder releasably fixed with respect to said carriage, a piston rod secured at one end to said tramper footing and mounted in said cyinder for reciprocal movement with respect thereto, a piston means reciprocally positioned in said cyinder and connected to the other end of said piston rod, means for moving said piston longitudinally in said cylinder, and means for directing a force generated against said piston substantially along the center line of said piston and cylinder wherein said means for directing the force generated against said piston along the center line of said piston and cylinder comprises a first spherical bearing means for joining said piston rod to the center of said tramper footing and a secm d spherical bearing means for joining said cylinder to said carriage to permit a slight lateral movement of said tramper while maintaining the line of force along the center line of said piston.

* * * * *